Jan. 26, 1954   H. F. SMITH   2,667,177
FLUSH TANK VALVE WITH VACUUM BREAKER
Filed Nov. 23, 1948
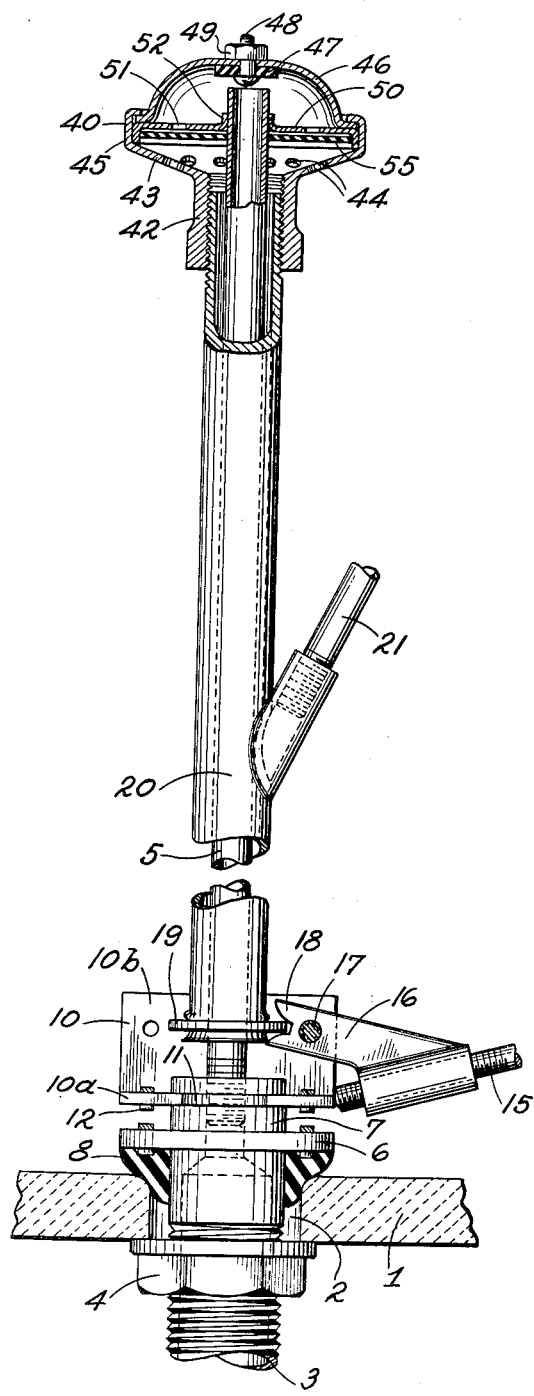
INVENTOR.
HARRY FORD SMITH
BY
Richey & Watts
ATTORNEYS Patented Jan. 26, 1954

2,667,177

UNITED STATES PATENT OFFICE 2,667,177

FLUSH TANK VALVE WITH VACUUM BREAKER

Harry Ford Smith, Lexington, Ohio, assignor to Mansfield Sanitary Pottery, Inc., Perrysville, Ohio, a corporation of Ohio Application November 23, 1948, Serial No. 61,647

9 Claims. (Cl. 137—218)

This invention relates generally to hydraulic valves and particularly to non-siphoning or siphon-breaking valve devices.

There are numerous places where non-siphoning valves should be used, for example, on inlet pipes in flush tanks and in washing machines of various types and elsewhere. However, the non-siphoning valve devices in use heretofore have not proven to be entirely satisfactory from standpoints of either simplicity in construction or certainty in use.

The present invention provides valve devices which are not only of simple, effective construction but which are positive in operation.

The present invention will be better understood by those skilled in the art from the following description and the drawing which accompany this specification and in which the figure is a side elevational view partly in section of one embodiment of the present invention associated with other parts of a flush tank inlet pipe.

In the drawing, 1 designates the lower wall of a flush tank having an opening 2 therethrough to receive a water inlet pipe 3 which has threaded engagement with a nut 4 to press against the lower surface of tank wall 1 and which has a reduced diameter extension 5 which is open at its upper end. A collar 6 made in two equal parts, seated in a recess in the unthreaded portion 7 of inlet pipe 3, engages the top side of a gasket 8 and forces the gasket into liquid sealing contact with the tank wall 1 about opening 2, thereby sealing opening 2 against escape of liquid therethrough.

Two similar plates 10 have horizontal portions 10a and parallel vertical portions 10b. The horizontal portions 10a extend toward each other into an annular recess 11 in the unthreaded portion 7 of inlet pipe 3 above the collar 6 and may be connected together in any suitable manner as by U-shaped clips 12. The portions 10a fit loosely in recess 11 and thus the assembled plates 10 may rotate freely around the inlet pipe.

A float ball rod 15 is adjustably screw-threaded into a lever 16 which is rotatably mounted on pivot 17 extending between the two opposed portions 10b of plate 10 and has a notched end 18 to receive a flange-like ring 19 fixed to the lower end of hush pipe 20.

The hush pipe 20 surrounds the reduced diameter portion 5 of the inlet pipe and extends from between the vertical portions 10b of plate 10 nearly to the upper end of inlet pipe 3. A refill tube 21 communicates with the interior of pipe 20 between its ends and a non-siphoning valve embodying the present invention is attached to the hush pipe at its upper end.

The non-siphoning valve of Fig. 1 comprises a dome-shaped structure 40 which is preferably screw-threaded to hush pipe 20 so that it can be adjusted relative to the latter. This structure 40 includes a lower shell which has a tubular portion 42 to surround hush pipe 20, an outwardly extending portion 43 provided with a plurality of openings 44 and an upwardly extending flange portion 45 which receives and is bent inwardly to retain the upper part 46 of the dome structure 40. Part 46 is partly spherical in shape and has secured to its upper inner side a valve 47 positioned to seat on the upper end of inlet pipe 3. This valve may be attached to part 46 as by screw 48 projecting upwardly through the valve and may be locked in position by nut 49.

A diaphragm or partition 50 extends horizontally across the dome structure, is retained in position by the upper and lower parts of the latter and is provided with a plurality of restricted water passages 51 and has a central opening defined by an inner peripheral flange 52 which engages inlet pipe 3 closely enough to maintain the hush pipe coaxial with the inlet pipe while permitting free endwise coaxial movement of the hush pipe relative to the inlet pipe. Ring or disk 55, which is preferably composed of flexible or deformable material such as natural or synthetic rubber or the like, is positioned in the dome structure beneath plate 50. This ring which has a central opening a little larger than the outside diameter of inlet pipe 3 may be moved downwardly to close the air inlet openings 44 in the housing or upwardly to close the water passages 51 in the plate or diaphragm 50.

It will be understood that when the water level in the flush tank falls the float ball (not shown) attached to rod 5 will move downwardly with resultant pivoting of lever 16 about pivot pin 17 and upward axial movement of hush pipe 20 relative to inlet pipe 3, thereby moving valve 47 off its seat at the upper end of the inlet pipe and permitting water under pressure to flow into the dome structure 40. This incoming water flows through holes 51 in the diaphragm 50 forcing ring 55 down against the inclined portion 43 of the housing and thereby closing the air inlet openings 44. The water continues on down between the inlet pipe and hush pipe and escapes at the lower end of the hush pipe. When the water level rises in the tank and the hush pipe is moved downwardly by lever 16, valve 47 seats on the upper end of inlet pipe 3 and interrupts the flow of water into the housing 40 whereupon the air pressure acting through holes 44 restores or tends to move ring 55 away from openings 44. Any reduced pressure condition tending to draw water up through diaphragm 50 and into inlet pipe 3 moves ring 55 against the under surface of diaphragm 50 thereby closing holes 51 therethrough and effectively preventing any such siphoning action. It will be understood that the openings 44 are always positioned some little distance, for example one inch, above the water level in the tank.

The operation of the apparatus of the figure has been partly described hereinabove but will be better understood from the following description, part of which is additional to that previously stated. When the device of the figure is in use and valve 47 has been seated on pipe 3 following the filling of the tank with water up to the indicated level, all the water in housing 40 flows down the hush pipe and the housing and hush pipe are filled with air down to the surface level of water in the tank. When the water pressure on the top of ring 55 is relieved, it springs upwardly due to its own resiliency and it uncovers openings 44 through which air enters and fills the housing. If under these conditions a negative pressure is created within inlet pipe 3 and valve 47 is moved away from its seat at the upper end of the pipe, ring 55 may move farther upward and cover openings 51 but air may still flow between pipe 3 and plate 50 due to the sliding fit existing between these parts. However, no tank water can be drawn into the housing because it is filled with air and open to the atmosphere by way of openings 44. So long as that condition exists, no suction force from within pipe 3 can be applied to the interior of the hush pipe which will be sufficient to raise the level of the water therein. Thus, every time valve 47 is closed, water is drained out of the housing 40 and air flows in to fill the housing and water cannot be drawn into the housing from the tank.

This application is a continuation-in-part of my copending application Serial No. 608,408, filed August 2, 1945, now abandoned, and subject matter shown but not claimed herein is being claimed in another continuation-in-part of said application, namely Serial No. 61,646, filed November 23, 1948, now Patent No. 2,609,830, issued September 9, 1952.

Although I have shown one embodiment of the present invention, it will be understood that many other modifications are intended to be included within what is claimed.

What is claimed is:

1. A non-siphoning inlet valve for a flush tank comprising an inlet pipe having a valve seat at its open end to be positioned above the predetermined water level in the tank, a hush pipe around and movable endwise relative to said inlet pipe, a housing adjustably attached to the end of said hush pipe adjacent to said open end of the inlet pipe, said housing having an air inlet opening near said hush pipe, a valve to engage said seat and a rigid partition secured to the housing between said air inlet and said valve, said partition having central, sliding, hush pipe guiding engagement with said inlet pipe and having a plurality of water passages therethrough, resilient valve means bodily movable in the housing for engaging the partition or housing and closing either said water passages or said air inlet, and means responsive to the liquid level in the tank for moving the said hush pipe axially.

2. A non-siphoning inlet valve for a flush tank comprising an inlet pipe having a valve seat at its open end to be positioned above the predetermined water level in the tank, a hush pipe around and movable endwise relative to said inlet pipe, a housing adjustably attached to the end of said hush pipe adjacent to said open end of the inlet pipe, said housing having a plurality of air inlets near said hush pipe, a valve to engage said seat and a rigid partition secured to the housing between said air inlets and said valve, said partition having central, sliding, hush pipe guiding engagement with said inlet pipe and a plurality of water passages smaller than said air inlet passages, and resilient means in the housing and bodily movable into contact with said housing to close said air inlets when water is admitted into the housing above said plate and into contact with the partition to close said passages when the flow of water is interrupted, and means responsive to the liquid level in the tank for moving the said hush pipe axially.

3. A non-siphoning inlet valve for a flush tank comprising an inlet pipe having a valve seat at its open end to be positioned above the predetermined water level in the tank, a hush pipe around and movable endwise relative to said inlet pipe, a housing provided with an opening having screw-threaded attachment to said hush pipe and enclosing the open end of the inlet pipe, said housing having a plurality of air inlets adjacent to said threaded opening, a valve in the housing remote from said opening to engage said seat, and a rigid partition fixed to said housing between said air inlets and said valve, said partition having a central opening receiving said inlet pipe with sliding, hush pipe guiding engagement and a plurality of water passages around said central opening and smaller than said air inlets, and a resilient valve around said inlet pipe on the water outlet side of said partition and freely movable bodily relative to the housing and partition to close said water passages and air inlet, and means responsive to the liquid level in the tank for moving the said hush pipe axially.

4. A non-siphoning inlet valve for a flush tank comprising an inlet pipe having a valve seat at its open end to be positioned above the predetermined water level in the tank, an axially movable hush pipe around said inlet pipe, and means defining a plurality of successive chambers and restricted passages through which water may pass from said inlet pipe into said tank, said means comprising a housing on the hush pipe, a partition in the housing dividing the space therewithin into two chambers and having a plurality of restricted passages connecting said chambers, the inlet pipe extending into one of said chambers, a valve carried by said housing in one of said chambers and engageable with said seat to restrict the flow of water from said inlet pipe, the housing having a plurality of air inlets leading into said other chamber and a restricted opening leading from said other chamber into said hush pipe, a resilient ring in said other chamber bodily movable by fluid pressure to open and close said restricted passages through said partition and said air inlets.

5. A non-siphoning device comprising an axially movable housing defining a chamber having a water inlet, a water outlet and a plurality of air inlets, a valve carried by said housing to close said inlet, a rigid partition fixed at its outer periphery to the housing extending transversely in said chamber and separating said inlet from said water outlet and air inlets, said partition having extending therethrough a plurality of water passages smaller than said air inlets, and a resilient, ring-like axially flexible valve in said chamber between said partition and the said air inlets, said valve being movable by being shifted bodily in said chamber and flexed axially to engage with the housing to close said air inlets under the force of water passing from the water inlet through said partition and to engage with said partition to close said water passages under the force of air flowing through said air inlets when the flow of water is interrupted.

6. A non-siphoning device comprising an inlet pipe having an open end provided with a valve seat, an axially movable hush pipe around the inlet pipe, a housing attached to the hush pipe and surrounding the open end of the inlet pipe, said housing having a plurality of air inlet holes near said hush pipe, a flat partition extending transversely to and encircling said inlet pipe and fixed at its outer periphery to said housing, said partition having a plurality of passages extending therethrough between its inner and outer peripheries, said passages being relatively small as compared with said air inlet holes, a valve in the housing on the inlet side of said partition and engageable with said seat, and an axially flexible, normally flat, resilient disk on the water outlet side of said partition loosely encircling said inlet pipe, extending outward radially to beyond said passages and being freely movable bodily and axially in the housing, said disk being responsive to fluid pressure acting through either of said sets of inlet holes and passages to seal the other set against the passage of fluid therethrough.

7. A non-siphoning device comprising an axially movable hush pipe, a housing attached to one end of said hush pipe, a fixed inlet pipe within said hush pipe and having a valve seat within said housing, said housing having a plurality of normally open air inlet holes near said hush pipe, a flat partition within and fixed at its outer periphery to said housing, said partition having a plurality of water passages extending therethrough, said passages being relatively small as compared with said air inlet holes, a valve in the housing on the inlet side of said partition and engageable with said seat, and an axially flexible, normally flat, resilient disk on the outlet side of said partition loosely encircling said inlet pipe and extending outwardly substantially to the housing wall, said disk being freely movable bodily and axially in the housing, said disk being responsive to fluid pressure acting through either of said sets of inlet holes and passages to seal the other set against the passage of fluid therethrough.

8. A non-siphoning device comprising an inlet pipe having an open end provided with a valve seat, an axially movable hush pipe around the inlet pipe, a housing attached to the hush pipe and surrounding the open end of the inlet pipe, said housing having an inclined bottom wall provided with a plurality of circumferentially arranged air inlet holes, a flat partition slidably encircling said inlet pipe and fixed at its periphery to a side wall of said housing, said partition having a plurality of circumferentially spaced passages extending therethrough between the inlet pipe and said side wall, said passages being relatively small as compared with said air inlet holes, a valve in the housing on the inlet side of said partition and engageable with said seat, and an axially flexible, normally flat, resilient disk loosely encircling said inlet pipe on the water outlet side of said partition and extending outwardly to beyond said inlet holes and passages, said disk being responsive to fluid pressure acting through either of said sets of holes to seal the other set of holes against the passage of fluid therethrough, said disk being movable bodily and deflectably in the housing to close either set of said holes or said passages in response to fluid pressure acting through the other set.

9. A non-siphoning device comprising an axially movable housing, a flat partition dividing the space within the housing into two chambers and fixed at its outer periphery to said housing, said partition having a plurality of water passages extending therethrough, a water inlet pipe having a valve seat at its open end and leading into one of said chambers, a valve carried by said housing and engageable with said seat, a hush pipe leading from the other of said chambers, said housing having a plurality of normally open air inlet holes opening into said other chamber, and an axially flexible, normally flat, resilient disk in said other chamber on the outlet side of said partition, said disk being freely movable bodily and axially in the housing and being responsive to fluid pressure acting through either of said sets of air inlet holes and said water passages to seal the other set against the flow of fluid therethrough.

HARRY FORD SMITH.

References Cited in the file of this patent

UNITED STATES PATENTS

| Number | Name | Date |
| --- | --- | --- |
| 2,117,389 | Yoder | May 17, 1938 |
| 2,159,691 | Fox | May 23, 1939 |
| 2,211,212 | Langdon | Aug. 13, 1940 |
| 2,219,259 | Horn | Oct. 22, 1940 |
| 2,247,525 | Sherwood | July 1, 1941 |
| 2,270,910 | Svirsky | Jan. 27, 1942 |
| 2,284,051 | Gilbert | May 26, 1942 |
| 2,290,145 | Owens | July 14, 1942 |
| 2,292,373 | Groeniger | Aug. 11, 1942 |
| 2,294,785 | Langdon | Sept. 1, 1942 |
| 2,303,037 | Fredrickson | Nov. 24, 1942 |
| 2,318,236 | Layton | May 4, 1943 |
| 2,382,427 | Langdon | Aug. 14, 1945 |
| 2,427,525 | Glanzer | Sept. 16, 1947 |
| 2,516,578 | Kreiner | July 25, 1950 |